(12) United States Patent
Hou

(10) Patent No.: US 7,068,384 B1
(45) Date of Patent: Jun. 27, 2006

(54) METHOD AND SYSTEM FOR TRANSMITTING A FACSIMILE FROM A COMPUTER TO A REMOTE FAX MACHINE USING AN INTERNET FAX MACHINE AS TRANSFER STATION

(75) Inventor: Xiaoan Hou, Santa Clara, CA (US)

(73) Assignee: Ricoh Co., Ltd., Tokyo (JP)

( * ) Notice: Subject to any disclaimer, the term of this patent is extended or adjusted under 35 U.S.C. 154(b) by 773 days.

(21) Appl. No.: 09/714,190

(22) Filed: Nov. 17, 2000

(51) Int. Cl.
*G06F 15/00* (2006.01)
*H04N 1/00* (2006.01)

(52) U.S. Cl. ............... 358/1.15; 358/402; 358/407; 358/435; 358/438; 358/440

(58) Field of Classification Search .......... 358/407, 358/1.15, 1.16, 402, 435, 438, 440
See application file for complete search history.

(56) References Cited

U.S. PATENT DOCUMENTS

| 5,859,967 | A | * | 1/1999 | Kaufeld et al. ............. 726/5 |
| 5,911,044 | A | | 6/1999 | Lo et al. |
| 5,917,615 | A | * | 6/1999 | Reifman et al. ........... 358/468 |
| 6,092,104 | A | | 7/2000 | Kelly |
| 6,330,070 | B1 | * | 12/2001 | Toyoda et al. ............. 358/1.15 |
| 6,384,927 | B1 | * | 5/2002 | Mori ....................... 358/1.15 |
| 6,441,916 | B1 | * | 8/2002 | Toyoda ..................... 358/1.15 |
| 6,512,593 | B1 | * | 1/2003 | Yashiki ..................... 358/1.15 |
| 6,633,413 | B1 | * | 10/2003 | Schlank et al. ............ 358/468 |
| 6,700,674 | B1 | * | 3/2004 | Otsuka et al. ............. 358/1.15 |
| 6,816,911 | B1 | * | 11/2004 | Toyoda et al. ............. 709/238 |
| 6,897,985 | B1 | * | 5/2005 | Toyoda ..................... 358/402 |

FOREIGN PATENT DOCUMENTS

EP 0836315 4/1998

OTHER PUBLICATIONS

Brochure on the Ricoh FAX 4800L, printed prior to filing date of this application (4 pages).
"Print-2-Image Version 6.x, Printer Driver and Viewer Software Program", p. 12, Imecon Group, May 2000, USA (2 pages).
Screen shots of "Mytalk FAX" software, released 1994 (3 pages).

* cited by examiner

*Primary Examiner*—Edward Coles
*Assistant Examiner*—Chan S. Park
(74) *Attorney, Agent, or Firm*—Oblon, Spivak, McClelland, Maier & Neustadt, P.C.

(57) ABSTRACT

A system, method, and computer program product for transmission of facsimiles via the Internet. An Internet fax driver is installed on a computer to send a document converted to an image using an electronic mail message over the Internet to an Internet fax machine. The electronic mail message, or fax request, can be either to Print a Document which is printed at the Internet fax machine or to Fax a Document which is sent from the Internet fax machine to a destination G3 fax machine designated by the user. Exemplary embodiments of the Internet fax driver include a driver which automatically converts a document to an image and a driver that allows the user to select a document already an image to send.

16 Claims, 11 Drawing Sheets electronic mail address fields

```
                                    1080
                                    /
MAIL FROM: sender email address
RCPT TO: electronic mail address fields
SUBJECT: sender subject
COMMENTS: sender message
DATA
TIFFfile
```

*FIG. 10*

METHOD AND SYSTEM FOR TRANSMITTING A FACSIMILE FROM A COMPUTER TO A REMOTE FAX MACHINE USING AN INTERNET FAX MACHINE AS TRANSFER STATION

BACKGROUND OF THE INVENTION

1. Field of the Invention:

This invention relates generally to transmission of facsimiles over the Internet. More particularly, this invention relates to systems, methods, and computer program product configured to transmit facsimiles over the Internet via electronic mail messages.

2. Discussion of the Background:

There are several ways to transmit a facsimile. Conventionally, facsimile transmission has required the use of either a source fax machine or a computer with a fax modem. For example, FIG. 1 shows a source fax machine 100, a computer with a modem 102, and a destination fax machine 106 connected to public switched telephone network (PSTN) 104. Either the source fax machine 100 or the computer 104 dials the fax number of the destination fax machine 106 to transmit the facsimile over standard telephone lines, PSTN 104. These fax machines are commonly known as G3 fax machines.

The shortcomings of the conventional systems are as follows. For the source fax machine 100, the user is required to go to the fax machine, insert the documents to be faxed, and manually dial the fax number of the destination fax machine 106. This can be a problem if the source fax machine is not nearby. In the case of the computer, a fax modem is required in order for the computer to transmit a facsimile. This requires the user to either install a fax modem on his computer or go to a computer that already has a fax modem. Either option is inconvenient for the user.

With the advent of the Internet, Internet fax has emerged and been standardized as specified by RFCs (Request for Comments) 2301–2305. Systems for transmitting a facsimile over the Internet rather than the PSTN has been developed. This transmission has been performed by either a source fax machine or a computer. For example, FIG. 2 shows a source fax machine 200, a computer 206, and a destination fax machine 204 connected to the Internet 202. Either the source fax machine 200 or the computer 206 transmits a facsimile to the destination fax machine 204 over the Internet 202. The source fax machine and the destination fax machine have electronic email addresses. These fax machines are commonly known as Internet fax machines.

Ricoh Internet fax machine 4800L is an exemplary source fax machine 200 and destination fax machine 204 of FIG. 2. The Ricoh Internet fax machine can send and receive facsimile transmissions over the Internet via electronic mail messages. The process for sending a facsimile is as follows: The user inserts a document to be faxed into the Internet fax machine and enters the electronic mail address of the facsimile recipient. The Internet fax machine then scans the document to create an image in TIFF format and sends an electronic mail message with the image as an attachment through the Internet to the electronic mail address entered by the user.

The Internet fax machine may send a facsimile to the electronic mail address of another Internet fax machine or a computer, for example. The process for receiving a facsimile at a Ricoh Internet fax machine is as follows: The Internet fax machine receives an electronic mail message from the Internet and extracts the TIFF image attachment. The Internet fax machine then prints the image. If the Internet fax machine sends the facsimile to a computer, the facsimile is received as an electronic mail message at the computer. The computer user can then open the message and view or print the attached image file.

The Ricoh Internet fax machine can also send a facsimile to a G3 fax machine, i.e. a fax machine connected to the PSTN, rather than the Internet, by dialing the fax number of the G3 fax machine. Conversely, the G3 fax machine can transmit a facsimile to the Internet fax machine by dialing its fax number.

However, there are the following limitations or shortcomings with the current Internet fax and Internet fax machines. First, a facsimile image attached to an electronic mail message is in TIFF format. Other file formats like MS document or Excel Spread Sheet are not accepted by a standard Internet fax machine. Second, for an Internet fax machine, the user must still go to the source fax machine and perform the necessary steps manually to transmit the facsimile. So the fax machine must be nearby.

The first limitation was overcome by the Kelly patent (U.S. Pat. No. 6,092,104), which disclosed a method for capturing print images from a computer application software program and then transmitting the images to an electronic mail address specified by the user. The fax destination in Kelly can only be an electronic mail address. Since G3 fax machines are not addressed by an electronic mail address, the method in Kelly cannot be used to send the facsimile image to a G3 fax machine. Since G3 fax machines far outnumber Internet fax machines, the method in Kelly would be far more useful if the destination fax machine could be a G3 fax machine.

The challenge, as recognized by the present inventor, is to create a way to ask or request a remote Internet fax machine to send a facsimile even though the Internet fax machine is not nearby and thus overcome the second limitation of Internet fax machine mentioned above, to send any documents or images stored on a computer to and from anywhere in the world, and to extend the capabilities and usefulness of the Internet fax machine.

SUMMARY OF THE INVENTION

Consistent with the title of this section, only a brief description of selected features of the present invention are presented. A more complete description of the present invention is the subject of this entire document.

An object of the present invention is to transmit a facsimile over the Internet to an Internet fax machine.

Another object of the present invention is to transmit a facsimile to a fax machine connected to a PSTN via an Internet fax machine.

Another object of the present invention is to transmit a facsimile over the Internet using an electronic mail message.

Another object of the present invention is to create a fax forwarding request via an electronic mail message using an Internet fax electronic mail address format.

Another object of the present invention is to address the above-identified and other deficiencies of facsimile transmission systems and methods.

These and other objects are accomplished by way of an Internet facsimile transmission system, method, and computer program product constructed according to the present invention.

The invention creates an image to send as a facsimile over the Internet. If the image already exists, then the image is selected from a list of images stored in the computer. The user enters parameters of the receiving fax machine into to a graphical user interface on the computer. The parameters include the electronic mail address, password, and fax number of a fax machine. The destination fax machine may be either an Internet fax machine or a G3 fax machine. In the case of the G3 fax machine, the input parameters are the electronic mail address of the receiving Internet fax machine, the password of the Internet fax machine, and the fax number of the G3 fax machine. The receiving Internet fax machine is connected to the G3 fax machine via the PSTN. So, when a facsimile is sent to the G3 fax machine, it first goes to an Internet fax machine, which then dials the G3 fax machine and transfers the facsimile. In the case of the Internet fax machine, the input parameters are the electronic mail address, the password, and the fax number of the Internet fax machine.

An electronic mail address is formed which includes the parameters of the receiving fax machine. An example of an electronic mail address in Internet fax address format is described in "A Simple Mode of Facsimile Using Internet Mail," Request for Comments (RFC) 2301, the entire contents thereof incorporated herein by reference.

A fax request is then generated as an electronic mail message. The electronic mail message includes the electronic mail address that was formed and the image that was created. The electronic mail message is then transmitted over the Internet to the receiving fax machine. If the fax number transmitted in the fax request is the fax number of the Internet fax machine, then the facsimile is printed out at the Internet fax machine. However, if the fax number is that of the G3 fax machine, then the electronic mail message is first sent to the Internet fax machine designated by the electronic mail address and the password in the fax request. That Internet fax machine then dials the fax number of the G3 fax machine and transmits the facsimile to the G3 fax machine, where the facsimile is printed.

An Internet fax driver is used to perform the steps for transmitting a facsimile over the Internet to a fax machine. The Internet fax driver is an application program which includes a fax printer driver and an Internet fax controller. The fax printer driver enables the computer to perform data translation of a document into an image for the purpose of transmitting the document through the Internet. The Internet fax controller is an application program which provides the graphical user interface for the user to input parameters and which generates the fax request as an electronic mail message, then sends the message. During execution of the Internet fax driver, the processing is transparent to the user. The invention and its components will be described in detail below.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10 shows an exemplary message transmitted by the Internet fax driver of the present invention;

DETAILED DESCRIPTION OF THE PREFERRED EMBODIMENTS

Figure 1:
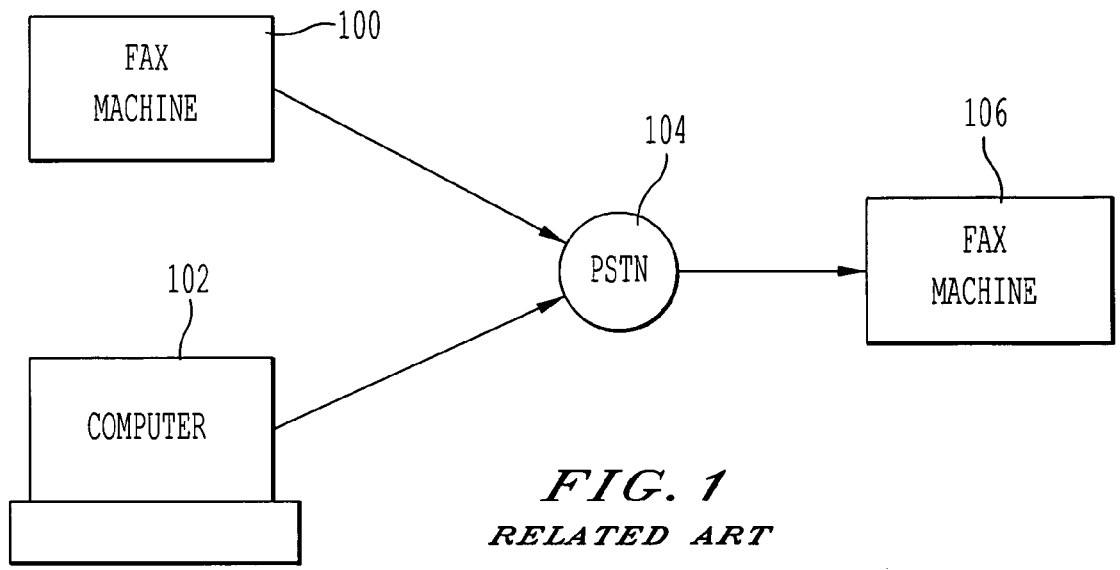
FIG. 1 is a block diagram of a conventional system which transmits facsimiles over the PSTN from either a source fax machine or a computer with a modem to a destination fax machine.
Figure 2:
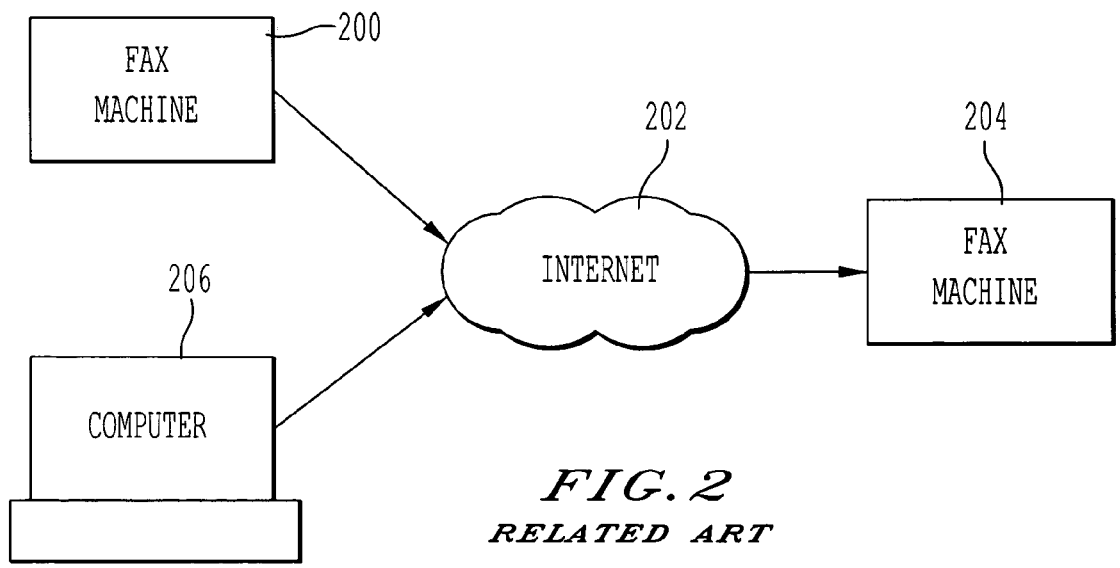
FIG. 2 is a block diagram of a conventional system which transmits facsimiles over the Internet from either a source fax machine or a computer to a destination fax machine.
Figure 3:
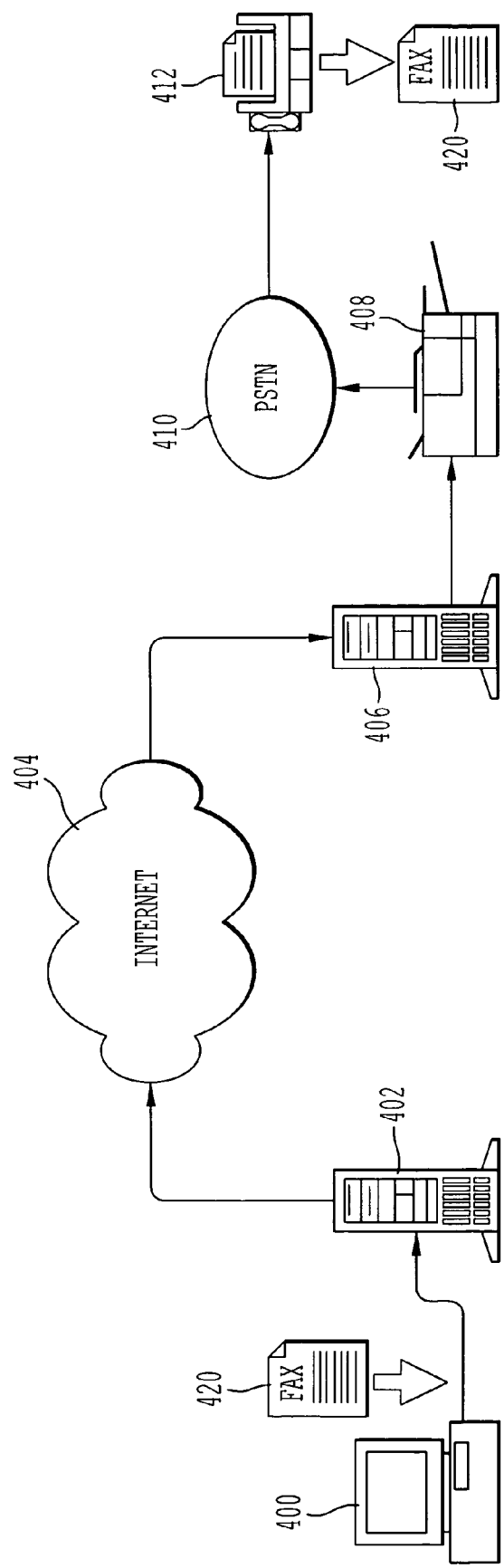
FIG. 3 is a block diagram of a facsimile transmission system in which a computer with an Internet fax driver of the present invention transmits a facsimile via an electronic mail message through the Internet to a destination fax machine.

Referring now to the drawings, FIG. 3 is a block diagram of the Internet facsimile transmission system of the present invention. The block diagram illustrates how a user utilizes the Internet fax driver to send a facsimile 420 to an Internet fax machine from a remote computer. A computer 400 on which the Internet fax driver is installed is connected to a mail server 402. The mail server 402 and the mail server 406 are connected to the Internet 404. An Internet fax machine 408 is connected to the mail server 406 and is also connected via the PSTN 410 to a G3 fax machine 412.

Figure 4:
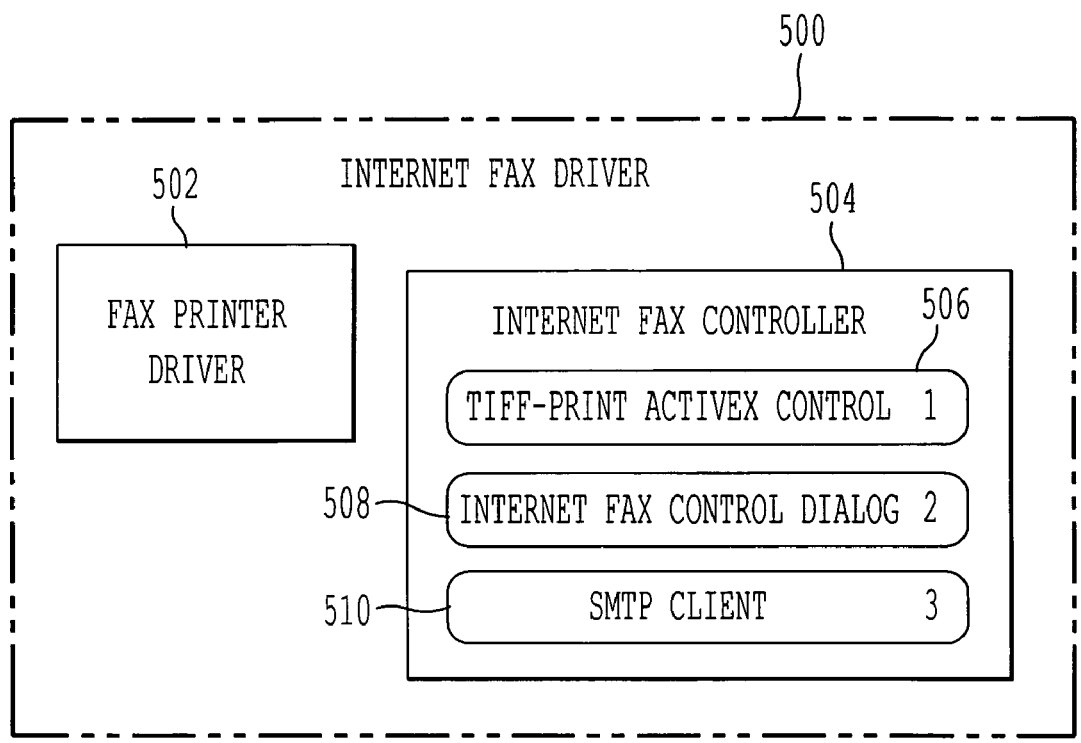
FIG. 4 shows the components of the Internet fax driver of the present invention.

FIG. 4 shows the components of the Internet fax driver 500 that interact with the Internet fax machine 408 of FIG. 3. The Internet fax driver 500 includes two main components—a fax printer driver 502 and an Internet fax controller 504, as mentioned previously. The Internet fax controller 504 further includes three sub-components—TIFF-Print ActiveX control 506, Internet fax control dialog 508, and Simple Mail Transport Protocol (SMTP) client 510. The fax printer driver 502 is selected by the user from the list of printer drivers or other drivers installed on the computer. The driver is selected from a print menu in a print window, for example, which opens in an application program when the user wishes to print or fax an image, document, or other material from his computer. The user can print or transfer any document, e.g., Microsoft Word, Excel spreadsheets, Powerpoint slides, and images, to a file using the fax printer driver 502. The fax printer driver 502 converts the document into an image and passes the image to the Internet fax controller 504. The TIFF-Print ActiveX control 506, a software component enabling different programs to interact, invokes the fax printer driver 502 to convert the input document to an image for transmission. For example, the TIFF format is used for transmitting facsimile documents, as described in "File Format for Internet Fax," RFC 2301, the entire contents thereof incorporated herein by reference. The Internet fax control dialog 508 provides a control window for the user to enter information required to generate the fax request. The SMTP client 510 delivers the fax request to the Internet fax machine 408 as an electronic mail message through Internet routing. For example, the electronic mail message may be sent using the SMTP mail protocol as described in "Simple Mail Transfer Protocol," RFC 821, and "Standard for the Format of ARPA Internet Text Messages," RFC 822, the entire contents thereof incorporated herein by reference.

Figure 5:
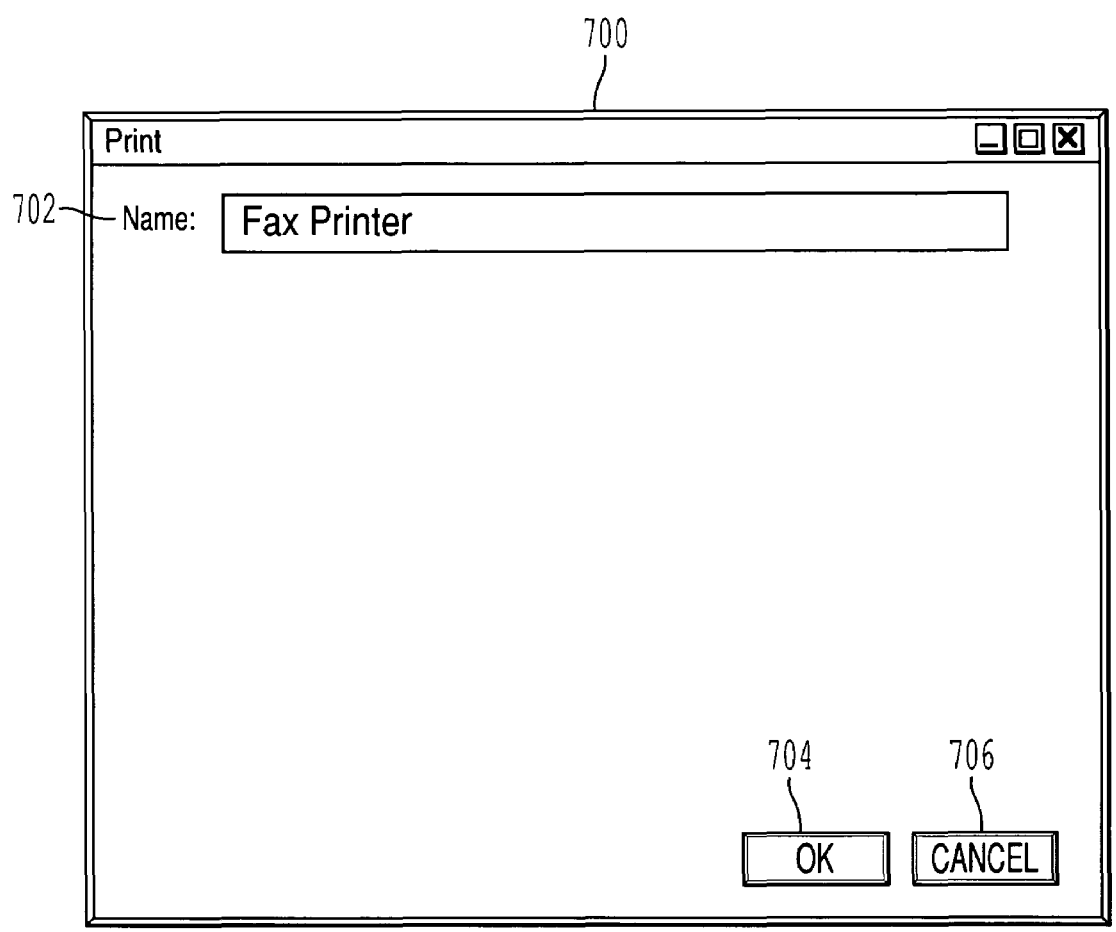
FIG. 5 shows a print window, which is part of a graphical user interface, used to select the fax printer driver used to create the facsimile.

FIG. 5 shows an exemplary print window 700 by which the user selects the fax printer driver for converting the document to an image. Through this window, the user selects the fax printer driver in field 702. If this is the correct driver, the user then clicks the OK button 704 to begin the conversion process. Otherwise, the user cancels the conversion process by clicking the cancel button 706.

Figure 6:
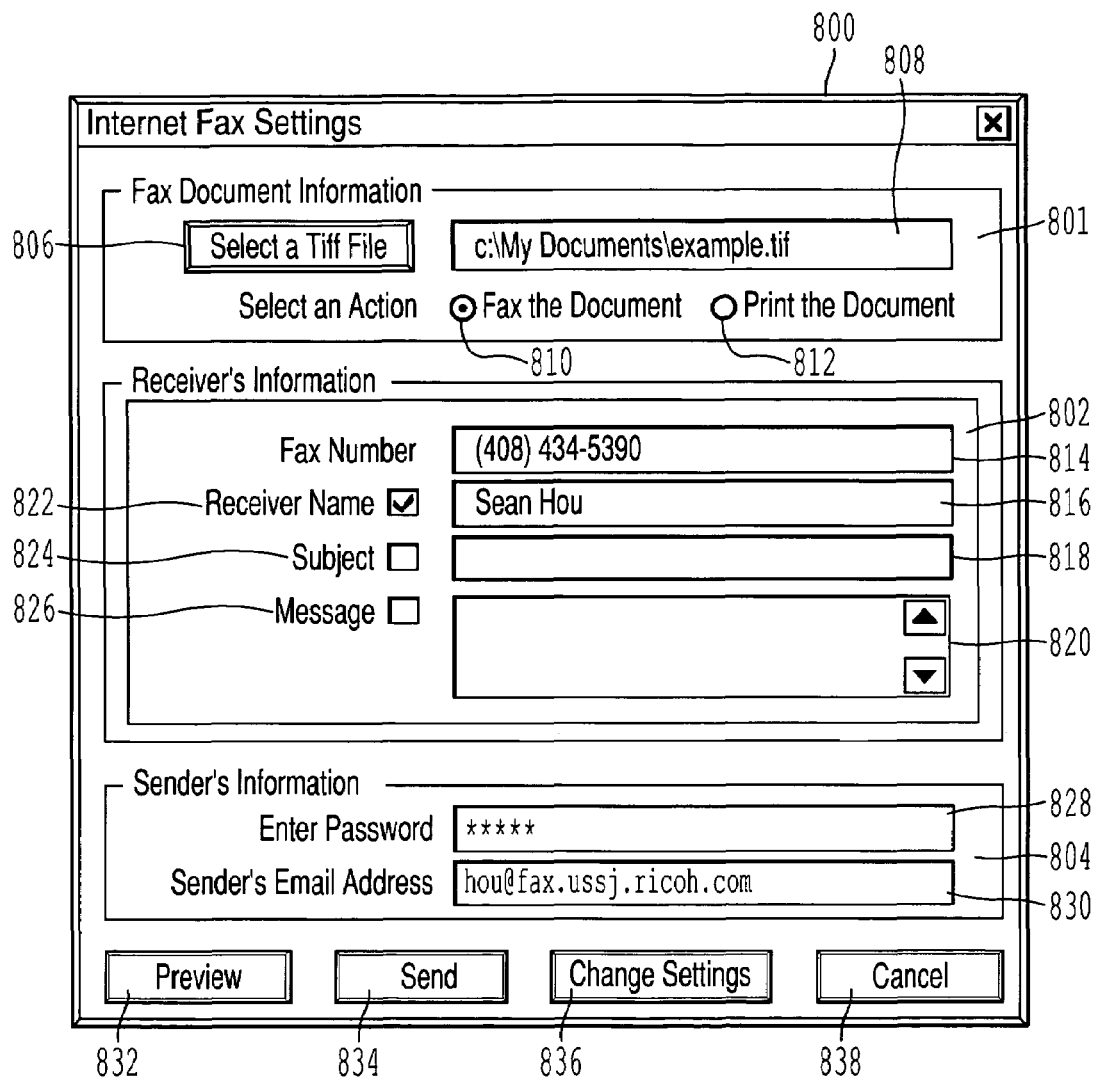
FIG. 6 shows a control window, which is part of a graphical user interface, used to input facsimile, receiver, and sender information for transmitting the facsimile.

FIG. 6 shows an exemplary Internet fax control panel window 800 used to input information needed in order to transmit the facsimile. The Internet fax control panel 800 includes three sections—fax document information 801, receiver's information 802, and sender's information 804. After the fax printer driver 502 converts the document to an image, the control panel 800 opens on the computer screen and the image file name appears in field 808. In this instance, select a TIFF file button 806 does not need to be used because the image file name is automatically input to field 808. The user then selects the action to either fax the document 810 or print the document 812. If the action to print the document 812 is selected, then the receiver's information 802 is not accessible for input. The Print the Document selection means that the Internet fax machine 408 will print out the document. As such, the fax number field 814 is not needed.

If the user selects the action to fax the document 810, then the receiver's information will be accessible so the user can input information about the destination G3 fax machine. The user enters the fax number of the destination G3 fax machine in field 814. This is a required field. Optionally, the user can check the receiver name box 822, the subject box 824, and the message box 826 and then fill in corresponding fields 816, 818, and 820.

Lastly, the user inputs sender's information 804. The user must enter his password in field 828. The user also inputs in field 830 his electronic mail address. Field 830 is optional. If the user does not enter an electronic mail address, then a default electronic mail address is used. Electronic notification is sent to the electronic mail address in field 830 later about the status of the user's fax request. The bottom row of the Internet fax control panel has four command buttons. The buttons are for Preview 832, Send 834, Change Settings 836, and Cancel 838.

Once the user is satisfied with the information entered in control panel 800, the user clicks Send 834 to send the facsimile right away or Cancel 838 to end the request without sending the facsimile. The user can also click Preview 832 to preview the facsimile or Change Settings 836 to change the Internet fax driver settings. It is not necessary to view the Internet fax settings before each facsimile is sent. Moreover, it is possible to store in memory the settings of a plurality of Internet fax machines and select a predefined Internet fax machine from a list. Upon clicking Change Settings 836, the Internet fax Settings window 900 appears.

Figure 7:
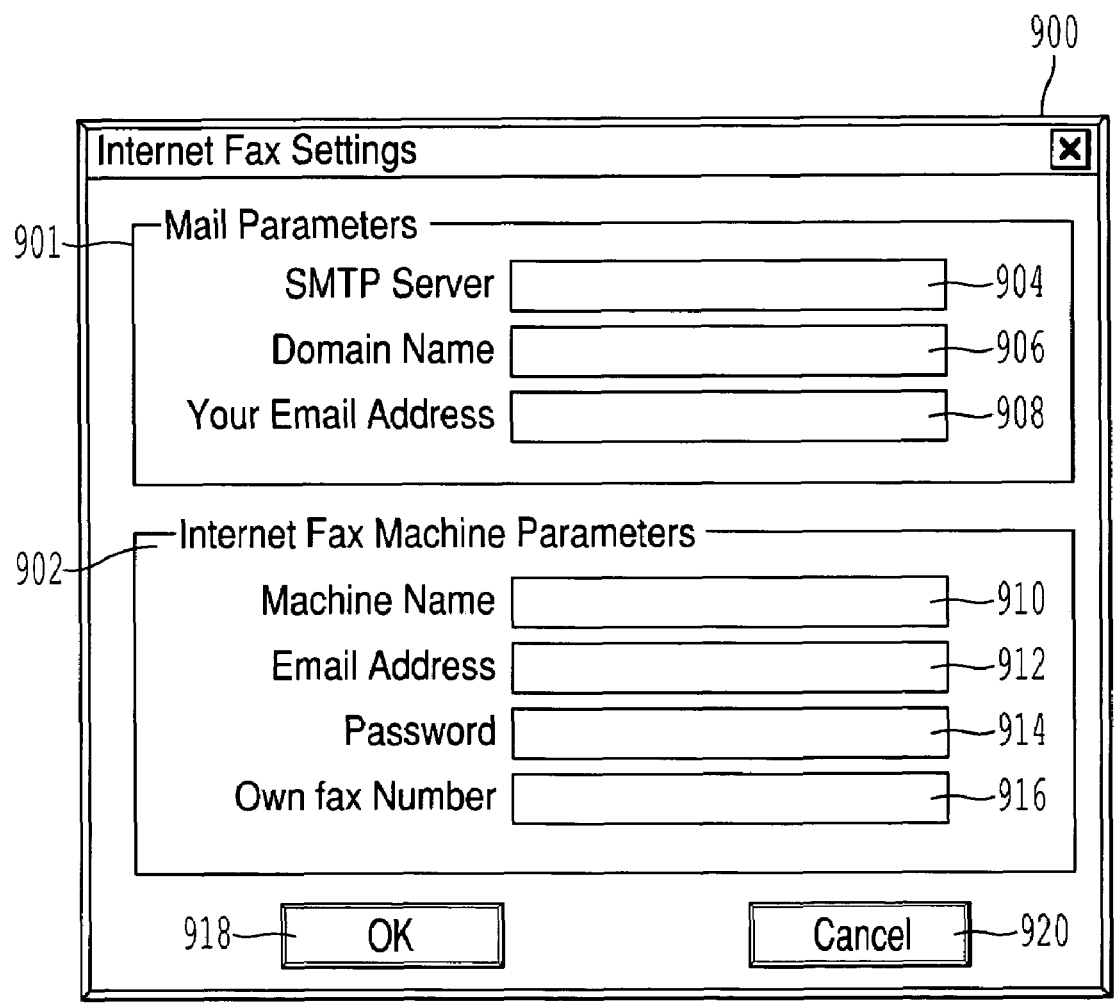
FIG. 7 shows a settings window, which is part of a graphical user interface, including mail parameters and Internet fax machine parameters used to transmit the facsimile via electronic mail message over the Internet.

FIG. 7 shows an exemplary Internet Fax Settings window 900 which appears upon clicking Change Settings 836 in FIG. 6. There are two sections in the Internet Fax Settings window 900. One section is for entering mail parameters 901 of the mail server 402 in FIG. 3 and the other section is for entering Internet fax machine parameters 902 of the Internet fax machine 408 in FIG. 3. In section 901, the fields are the mail server IP address, for example an SMTP server, in field 904, the domain name 906, and the user's electronic mail address 908. This electronic mail address is used as the default in field 830 of FIG. 6. In section 902, the Internet fax machine parameters are entered. The Internet fax machine domain name is entered in field 910, the machine electronic mail address in field 912, the machine password in field 914, and the machine fax number in field 916. These are the default values that are used by the Internet fax driver to identify the Internet fax machine to which it transmits. When the settings are correct, the user clicks the OK button 918 to set the settings as the new default settings. Otherwise, the user cancels the settings by clicking the Cancel button 920.

If the user selected the action to print the document 812 in FIG. 6, then the settings in fields 910 through 916 identify the Internet fax machine to which the image will be printed. If the user wishes to print the document to an alternate Internet fax machine, then the user changes the settings in these fields prior to sending the facsimile. Alternatively, if the user transmits a facsimile to a G3 fax machine, then the settings in fields 910 through 916 identify the Internet fax machine through which the G3 fax machine will be contacted. If the user transmits the facsimile through a different Internet fax machine, then the user changes the Internet fax machine parameters in fields 910 through 916 prior to sending the facsimile.

Figure 8:
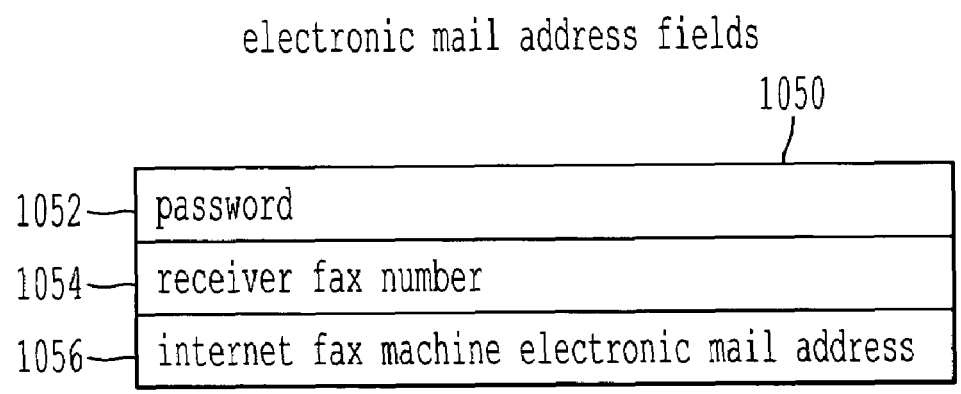
FIG. 8 shows an exemplary structure of the data fields in the electronic mail address of the fax request.

After the user has entered the desired information in the graphical user interface windows 700, 800, and 900, the SMTP client 510 collects the parameters of the fax machine and encodes the parameters into the electronic mail address of the fax request. Specifically, the fields included in the encoded electronic mail address have an exemplary data structure 1050 as shown in FIG. 8. The data structure include the Internet fax machine password 1052, the receiver fax number 1054, and the Internet fax machine electronic mail address 1056. The password comes from field 914 of FIG. 7. The SMTP client 510 selects the receiver fax number from field 814 of FIG. 6 if the facsimile is transmitted to a G3 fax machine 412, and field 916 of FIG. 7 if the facsimile is to be printed at the Internet fax machine 408. Further, the Internet fax machine electronic mail address comes from field 912 of FIG. 7.

The format of the electronic mail address in the fax request is based on the requirements of the receiver's mail environment. For example, a Netscape messenger requires the receiver electronic mail address format fax=password#fax number##<Internet fax machine electronic mail address> or a Lotus mail requires the format Internet fax machine electronic mail address (fax=password#fax number##). Other formats may be used, depending on the implementation of the system.

Figure 9:
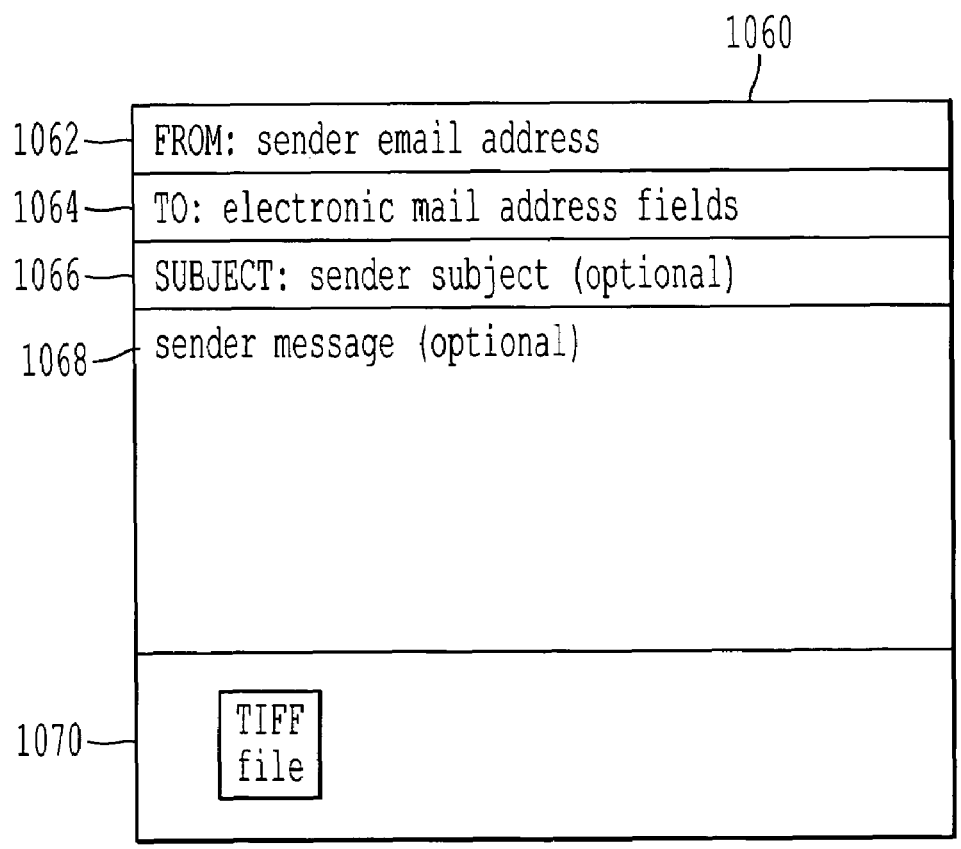
FIG. 9 shows an exemplary electronic mail message at the receiver containing the facsimile.

FIG. 9 shows an exemplary electronic mail environment 1060 including the different sections of the electronic mail message that would be sent from the Internet fax driver. Field 1062 contains the sender electronic mail address. Field 1064 contains the electronic mail address structure described in FIG. 8. Field 1066 contains subject information that the user entered in Field 818 of FIG. 6. Field 1068 contains a sender message that the user entered in Field 820 of FIG. 6. The subject line and the message are optional. The attachment section of the electronic mail is the TIFF image.

FIG. 10 shows an exemplary SMTP message 1080 in the standard mail format sent by the Internet fax driver. The data in this message could then be arranged in a recipient electronic mail environment 1060 as described in FIG. 9, for example.

The Internet fax machine compares the fax number in the received electronic mail message with its own fax number. If the two numbers match, then the Internet fax machine prints the document. If the fax number and the fax number of the Internet fax machine do not match, then the Internet fax machine dials the destination fax number and sends the facsimile to the dialed fax machine via PSTN. The dialed fax machine then prints the facsimile.

Figure 11:
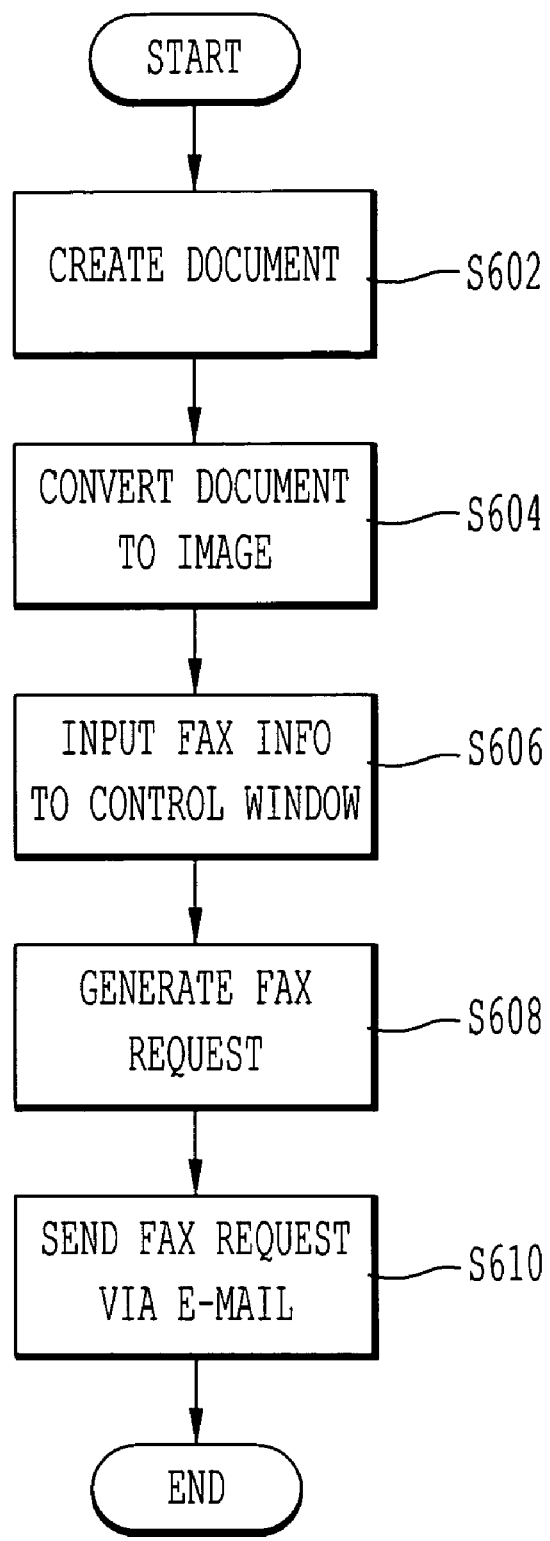
FIG. 11 is a block diagram of an embodiment of the Internet fax driver that creates the facsimile automatically.

FIG. 11 shows one embodiment of the Internet fax driver of the present invention. First, the user starts the Internet fax driver application program. In step S602, the user creates a document that the user wishes to fax or otherwise send from the computer. In step S604, the user selects a print option from the menu of the document window. The print window 700 of FIG. 5 opens on the computer screen. The user selects the fax printer driver upon which, a print command is sent to the fax printer driver. The fax printer driver then sends a print event to the Internet fax controller. The Internet fax controller then calls a print function. When the print function is called, a file name is automatically generated and then passed back to the fax printer driver. This file name can be randomly generated, have an association with the file which is to be printed (e.g., the same file name with a different three-letter extension such as "tif"), or be generated in a different manner. The fax printer driver starts printing the created document from step S602 into the automatically generated file as an image, using the file name created by the Internet fax controller. Once the document is converted to an image by printing, the windows 800 of FIGS. 6 and 900 of FIG. 7 are displayed for the user to enter the appropriate information in order to send a facsimile to the Internet fax machine. The user inputs the fax information in step S606. After the fax information is completed, the flow control passes to the SMTP client and the fax information is collected by the SMTP client in step S608. The SMTP client encodes the electronic mail address based on the information, attaches the facsimile document, and then sends the fax request over the Internet as an electronic mail message to the Internet fax machine in step S610.

Figure 12:
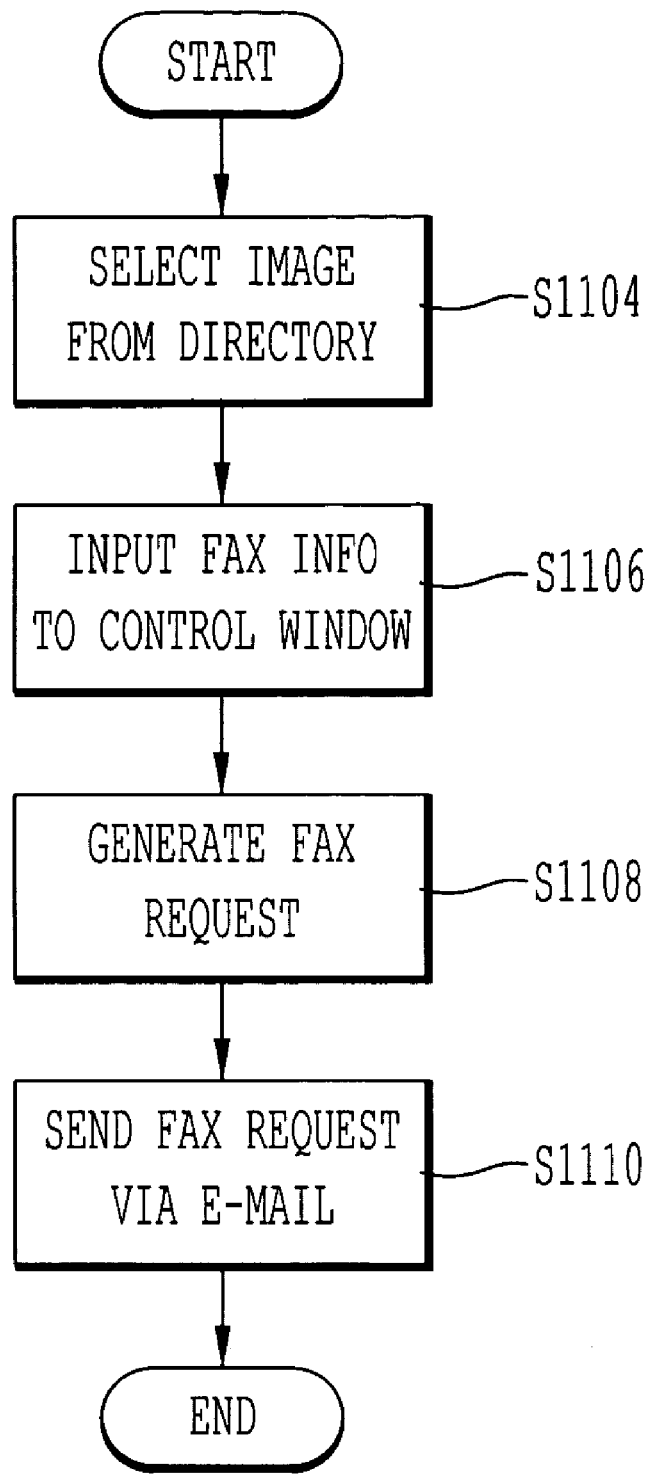
FIG. 12 is a flowchart of a second embodiment of the invention in which the user inputs the file name of the facsimile to be transmitted.
Figure 13:
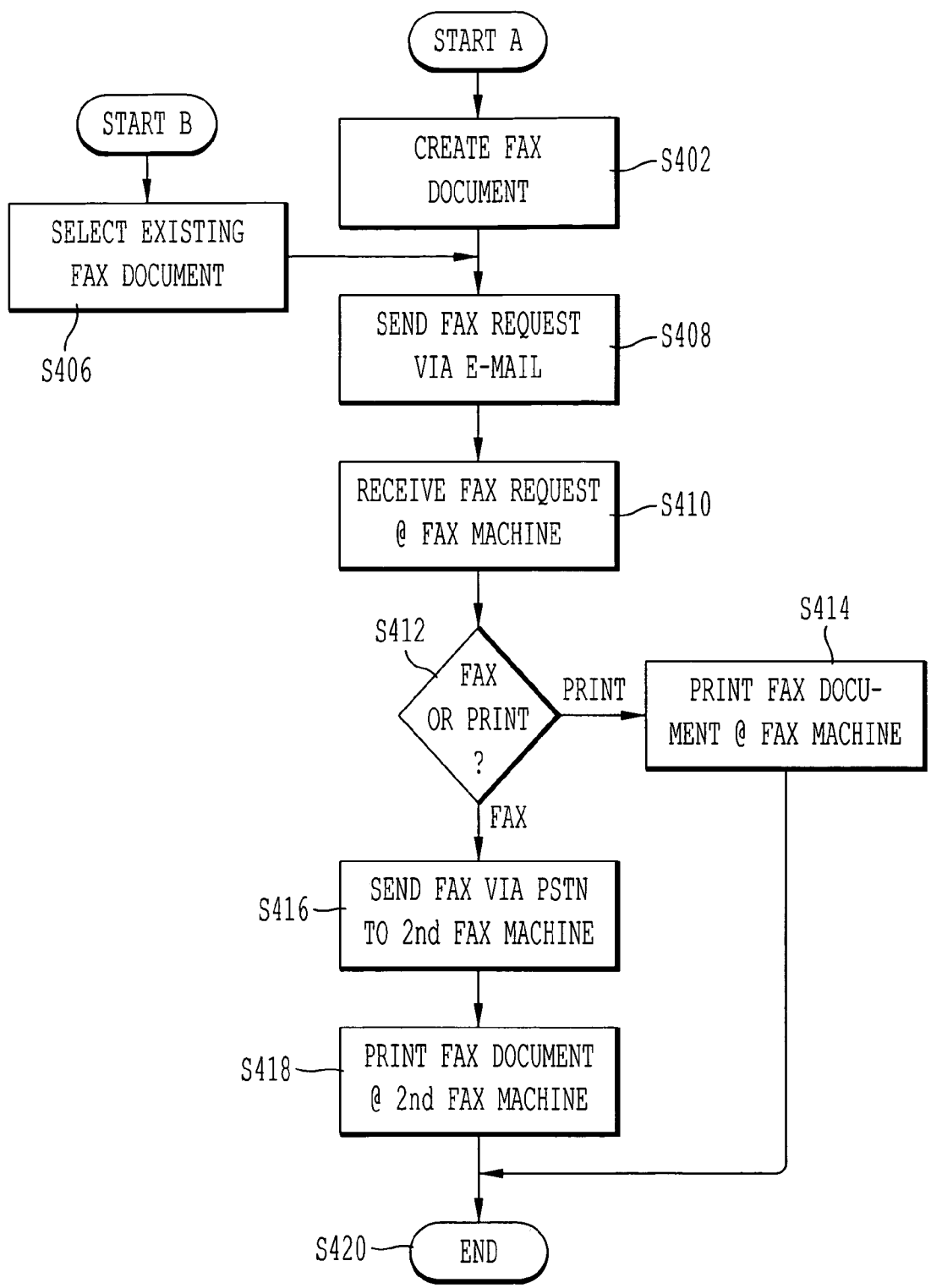
FIG. 13 is a flowchart of the operation of the system in FIG. 3.

FIG. 12 shows another embodiment of the Internet fax driver of the present invention. In this embodiment, the user selects the image file to be transmitted from the computer's directory (e.g., the image to be transmitted has already been created). So in step S1104, the Select a TIFF file button 806 of FIG. 6 is selected. Then a file open window is displayed so that the user may browse the file directories and select the desired file. The selected file name is shown in field 808 of FIG. 6. After the file is selected, the user inputs the appropriate information into interfaces 800 and 900 as shown in FIGS. 6 and 7 in step S1106. Then, the SMTP client generates the fax request in step S1108 and sends the fax request over the Internet as an electronic mail massage to the Internet fax machine in step FIG. 13 shows the steps performed by the facsimile transmission system of FIG. 3 when sending a facsimile 420 using the present invention. The user begins execution of the Internet fax driver on the computer 400 and performs the steps of either FIG. 11 or 12 to generate the image in either step S402 or step S406. The Internet fax driver generates a fax request as an electronic mail message and sends it along to mail server 402. The fax request is encoded to include the electronic mail address and password of the Internet fax machine 408, and the fax number of the receiving fax machine 412. Mail server 402 then transmits this message via the Internet 404 in step S408.

The destination mail server 406 receives the message, identifies the electronic mail address of the destination Internet fax machine, and sends the message to the Internet fax machine 408 corresponding to the destination electronic mail address in step S410. The Internet fax machine 408 receives the fax request and then parses or analyzes the message in order to determine its components. The parsing or analyzing includes breaking down the electronic mail address of the fax request into its components including the password and electronic mail address of the destination Internet fax machine and the fax number of the receiving fax machine. If the fax number is the fax number of the Internet fax machine, the facsimile 420 is printed at Internet fax machine 408 in step S414. If, however, the fax number is of another fax machine, then the facsimile 420 is transmitted via PSTN 410 to a G3 fax machine 412 in step S416 and printed there in step S418.

The mechanisms and processes set forth in the present description may be implemented using a conventional general purpose microprocessor programmed according to the teachings in the present specification, as will be appreciated to those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a computer to perform a process in accordance with the present invention. This storage medium can include, but it not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, numerous modifications and variations of the present invention are possible in light of the above teachings. For example, the structure of the software used to implement the invention may take on any desired form. For example, the Internet fax driver 500 illustrated in FIG. 4 may be implemented in a single program, multiple programs or routines, or in any desired manner. It is therefore to be understood that within the scope of the appended claims, the invention may be practiced otherwise than as specifically described herein.

The invention claimed is:

1. A method for transmitting a facsimile, comprising:

creating an image;

inputting parameters of a fax machine to a graphical user interface of a general purpose computer, the parameters including a password of the fax machine;

forming an electronic mail address that always includes (1) an Internet electronic mail address of the fax machine, (2) the input password of the fax machine, and (3) a receiver fax number;

generating a fax request as an electronic mail message, the electronic mail message including the electronic mail address and the image;

transmitting the electronic mail message to the fax machine; and determining whether to print the image at the fax machine or forward the image to a second fax machine corresponding to the receiver fax number based only on the electronic mail address, wherein the fax machine has only one password, and the receiver fax number and the password of the fax machine are always included in the electronic mail address.

2. The method of claim 1, further comprising:
receiving the electronic mail message by the fax machine;
analyzing the electronic mail message to determine the receiver fax number; and
transferring the image from the fax machine to a second fax machine corresponding to the receiver fax number.

3. The method of claim 1, wherein the transmitting steps comprises:
transmitting the electronic mail message to the fax machine through the Internet.

4. The method of claim 1, further comprising the step of:
selecting the image from a list of images.

5. The method of claim 1, wherein the creating steps comprises:
creating the image in TIFF format.

6. A computer program product including a computer readable medium for transmitting a facsimile, comprising:
an image creating code configured to create an image to be transmitted through the Internet;
a graphical user interface configured to allow a user to input parameters of a fax machine to which the image will be transmitted, the parameters including a password of the fax machine;
a fax request generating code configured to generate a fax request as an electronic mail message including the image and to send the fax request to the fax machine, the electronic mail message comprising an Internet electronic mail address of the fax machine, the password of the fax machine, a receiver fax number, and the image to be faxed; and
a determining code configured to determine whether to print the image at the fax machine or forward the image to a second fax machine corresponding to the receiver fax number based only on the electronic mail address,
wherein the fax machine has only one password, and the receiver fax number and the password of the fax machine are always included in the electronic mail address.

7. The computer program product of claim 6, further comprising:
an image selecting code configured to allow the user to select the image from a list of images.

8. The computer program product of claim 6, wherein the image creating code creates the image in TIFF format.

9. The computer program product of claim 6, wherein the graphical user interface comprises:
a control window configured to input parameters of the fax machine;
a settings window configured to input the parameters of the fax machine and mail parameters in order to generate a fax request as an electronic mail message; and
a print window configured to select a driver to create an image.

10. The computer program product of claim 6, wherein the image is printed at a second fax machine corresponding to the receiver fax number.

11. The computer program product of claim 6, wherein the image is printed at the fax machine.

12. A system for transmitting a facsimile, comprising:
means for creating an image;
means for inputting parameters of a fax machine to a graphical user interface of a general purpose computer, the parameters including a password of the fax machine, wherein the fax machine has only one password;
means for forming an electronic mail address that always includes (1) an Internet electronic mail address of the fax machine, (2) the input password of the fax machine, and (3) a receiver fax number, wherein the receiver fax number and the password of the fax machine is are always included in the electronic mail address;
means for generating a fax request as an electronic mail message, the electronic mail message including the electronic mail address and the image;
means for transmitting the electronic mail message to the fax machine, and
means for determining whether to print the image at the fax machine or forward the image to a second fax machine corresponding to the receiver fax number based only on the electronic mail address.

13. The system of claim 12, further comprising:
means for receiving the electronic mail message by the fax machine;
means for analyzing the electronic mail message to determine the receiver fax number; and
means for transferring the image from the fax machine to a second fax machine corresponding to the receiver fax number.

14. The system of claim 12, wherein the means for transmitting comprises:
means for transmitting the electronic mail message to the fax machine through the Internet.

15. The system of claim 12, further comprising:
means for selecting the image from a list of images.

16. The system of claim 12, wherein the means for creating comprises:
means for creating the image in TIFF format.

* * * * *